US008131477B2

(12) United States Patent
Li et al.

(10) Patent No.: US 8,131,477 B2
(45) Date of Patent: Mar. 6, 2012

(54) METHOD AND DEVICE FOR IMAGE-BASED BIOLOGICAL DATA QUANTIFICATION

(75) Inventors: Songtao Li, Arcadia, CA (US); Ming Hsieh, So. Pasadena, CA (US); Xian Tang, West Covina, CA (US); Ankuo Wang, Santa Ana, CA (US)

(73) Assignee: 3M Cogent, Inc., Pasadena, CA (US)

( * ) Notice: Subject to any disclaimer, the term of this patent is extended or adjusted under 35 U.S.C. 154(b) by 1470 days.

(21) Appl. No.: 11/501,377

(22) Filed: Aug. 8, 2006

(65) Prior Publication Data
US 2007/0112525 A1 May 17, 2007

Related U.S. Application Data

(60) Provisional application No. 60/737,665, filed on Nov. 16, 2005.

(51) Int. Cl.
*G06F 19/00* (2011.01)
*G06K 9/36* (2006.01)
*G01N 33/53* (2006.01)
*G01N 33/00* (2006.01)

(52) U.S. Cl. ........ 702/19; 382/282; 435/7.1; 435/7.92
(58) Field of Classification Search .................... None
See application file for complete search history.

(56) References Cited

U.S. PATENT DOCUMENTS

| | | | |
|---|---|---|---|
| 4,137,565 A | 1/1979 | Mager et al. |
| 4,315,310 A | 2/1982 | Bayliss et al. |
| 4,833,724 A | 5/1989 | Goel |
| 4,924,085 A | 5/1990 | Kato et al. |
| 5,233,404 A | 8/1993 | Lougheed et al. |
| 5,245,672 A | 9/1993 | Wilson et al. |
| 5,307,345 A | 4/1994 | Lozowick et al. |
| 5,416,573 A | 5/1995 | Sartor, Jr. |
| 5,426,684 A | 6/1995 | Gaborski et al. |
| 5,517,419 A | 5/1996 | Lanckton et al. |
| 5,528,355 A | 6/1996 | Maase et al. |
| 5,579,278 A | 11/1996 | McLaury |
| 5,596,454 A | 1/1997 | Hebert |
| 5,613,014 A | 3/1997 | Eshera et al. |
| 5,621,516 A | 4/1997 | Shinzaki et al. |
| 5,633,947 A | 5/1997 | Sibbald |
| 5,751,836 A | 5/1998 | Wildes et al. |
| 5,754,697 A | 5/1998 | Fu et al. |
| 5,778,175 A | 7/1998 | Paul et al. |
| 5,809,180 A | 9/1998 | Kimura et al. |
| 5,828,769 A | 10/1998 | Burns |
| 5,887,079 A | 3/1999 | Endo et al. |
| 5,900,993 A | 5/1999 | Betensky |
| 5,937,090 A | 8/1999 | Kim |
| 5,949,905 A | 9/1999 | Nichani et al. |
| 6,002,815 A | 12/1999 | Immega et al. |
| 6,038,226 A | 3/2000 | Ellersick et al. |
| 6,043,900 A | 3/2000 | Feng et al. |
| 6,175,407 B1 | 1/2001 | Sartor |
| 6,219,447 B1 | 4/2001 | Lee |
| 6,249,360 B1 | 6/2001 | Pollard et al. |
| 6,259,108 B1 | 7/2001 | Antonelli et al. |
| 6,324,020 B1 | 11/2001 | Teng et al. |
| 6,355,937 B2 | 3/2002 | Antonelli et al. |
| 6,360,307 B1 | 3/2002 | Raftery et al. |
| 6,384,832 B1 | 5/2002 | Muramatsu et al. |
| 6,473,194 B1 | 10/2002 | Sakai |
| 6,483,932 B1 | 11/2002 | Martinez et al. |
| 6,505,905 B1 | 1/2003 | Krouss |
| 6,618,076 B1 | 9/2003 | Sikthankar et al. |
| 6,654,142 B1 | 11/2003 | Min |
| 6,697,538 B1 | 2/2004 | Angenent et al. |
| 6,870,538 B2 | 3/2005 | MacInnis et al. |
| 6,879,709 B2 | 4/2005 | Tian et al. |
| 6,912,638 B2 | 6/2005 | Hellman et al. |
| 6,928,195 B2 | 8/2005 | Scott et al. |
| 6,934,409 B2 | 8/2005 | Ohara |
| 6,956,608 B1 | 10/2005 | Shapiro et al. |
| 6,980,286 B1 | 12/2005 | Feng |
| 6,993,165 B2 | 1/2006 | McClurg et al. |
| 7,020,951 B2 | 4/2006 | Lin et al. |
| 7,081,951 B2 | 7/2006 | Carver et al. |
| 7,088,872 B1 | 8/2006 | Hsieh et al. |
| 7,095,880 B2 | 8/2006 | Martinez et al. |
| 7,194,393 B2 | 3/2007 | Wei et al. |
| 7,203,344 B2 | 4/2007 | McClurg et al. |
| 7,267,799 B1 * | 9/2007 | Borich et al. .............. 422/82.05 |
| 7,277,562 B2 | 10/2007 | Zyzdryn |
| 7,315,632 B2 | 1/2008 | Spycher et al. |
| 7,430,303 B2 | 9/2008 | Sefcik et al. |
| 7,564,495 B2 | 7/2009 | Lee |
| 7,580,567 B2 | 8/2009 | Hsieh et al. |
| 7,587,064 B2 | 9/2009 | Owechko et al. |
| 7,616,788 B2 | 11/2009 | Hsieh et al. |
| 7,639,858 B2 | 12/2009 | Ross et al. |
| 7,796,266 B2 | 9/2010 | Cohen et al. |

(Continued)

FOREIGN PATENT DOCUMENTS

WO 01/18741 3/2001

OTHER PUBLICATIONS

Neidbala et al. (Anal. Biochem. (2001) vol. 293, pp. 22-30).*
Carlson et al. Biosensors and Bioelectronics (2000) vol. 14, pp. 841-848.*
Delmulle et al. J. Agric. Food Chem. (2005) vol. 53, pp. 3364-3368.*
Muhammad-Tahir Biosensor and Bioelectronics (2003) vol. 18, pp. 813-819.*
Seul et al. (Practical Algorithms for Image Analysis (2000), Chapter 1, Introduction, Cambridge University Press, pp. 1-22).*
Vincent et al. IEEE Transactions on Image Processing (1993) vol. 2, No. 2, pp. 176-201.*

(Continued)

*Primary Examiner* — Lori A Clow

(57) ABSTRACT

A device and method for determining a concentration of a biological target including capturing an image of a ticket that contains the biological target; extracting a region of interest from the captured image; detecting a target from the extracted region of interest; computing intensity of the target in the region of interest; and determining the concentration of the biological target according to the computed intensity.

20 Claims, 7 Drawing Sheets

U.S. PATENT DOCUMENTS

| | | |
|---|---|---|
| 7,840,062 B2 | 11/2010 | Boroczky et al. |
| 7,876,934 B2 | 1/2011 | Georgescu et al. |
| 7,912,528 B2 | 3/2011 | Krishnan et al. |
| 2002/0073211 A1 | 6/2002 | Lin et al. |
| 2003/0001395 A1 | 1/2003 | Barthelet et al. |
| 2003/0185420 A1* | 10/2003 | Sefcik et al. .................. 382/103 |
| 2004/0102931 A1 | 5/2004 | Ellis et al. |
| 2004/0114829 A1 | 6/2004 | LeFeuvre et al. |
| 2006/0019265 A1* | 1/2006 | Song et al. ........................ 435/6 |
| 2006/0224539 A1 | 10/2006 | Zhang et al. |
| 2006/0245631 A1 | 11/2006 | Levenson et al. |
| 2007/0140550 A1 | 6/2007 | Li et al. |
| 2007/0183663 A1 | 8/2007 | Wang et al. |
| 2007/0189582 A1 | 8/2007 | Hamza et al. |
| 2008/0292194 A1 | 11/2008 | Schmidt et al. |
| 2009/0268988 A1 | 10/2009 | Hsieh et al. |
| 2010/0027852 A1 | 2/2010 | Hsieh et al. |
| 2010/0049674 A1 | 2/2010 | Zohar et al. |
| 2010/0304358 A1 | 12/2010 | Nie et al. |

OTHER PUBLICATIONS

Seul et al. (Practical Algorithms for Image Analysis (2000), Chapter 1, Introduction, Cambridge University Press; Chapter 2, pp. 21-24 and 27-28; Chapter 3, pp. 56-95; Chapter 4, pp. 132-150; Chapter 7, pp. 248-264).*

U.S. Appl. No. 60/357,557, entitled "Hardware Architecture for Two Dimensional Digital Image Processing," filed Feb. 14, 2002.

* cited by examiner

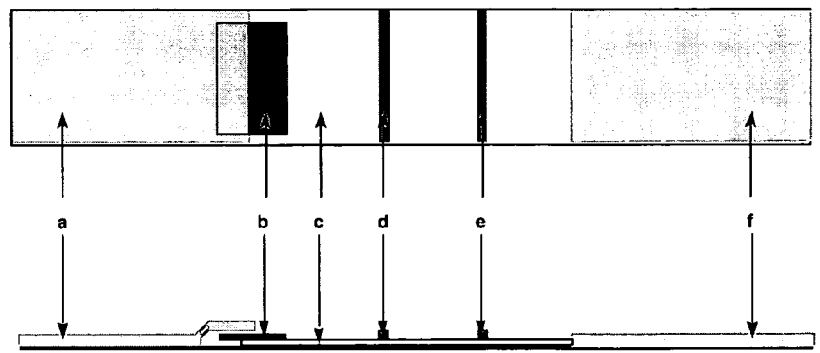
FIG. 1A
FIG. 1B
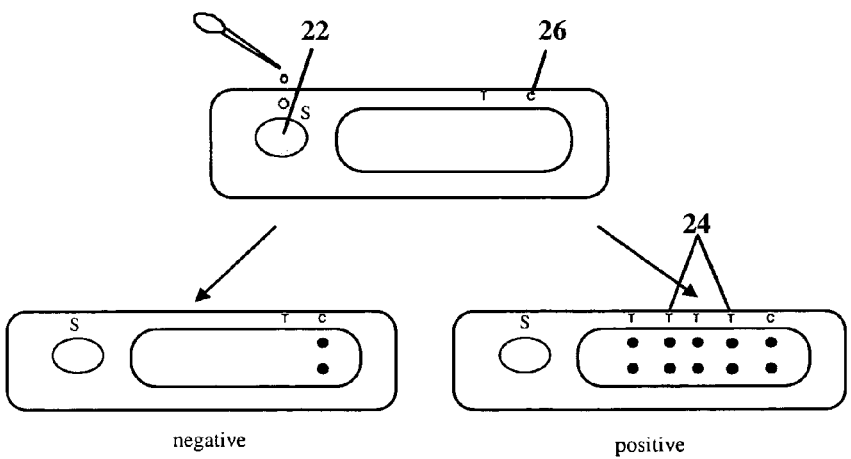
FIG. 2

FIG. 8A      Figure 8B
| -1 | 0 | +1 |
|---|---|---|
| -2 | 0 | +2 |
| -1 | 0 | +1 |
Gx
| +1 | +2 | +1 |
|---|---|---|
| 0 | 0 | 0 |
| -1 | -2 | -1 |
Gy
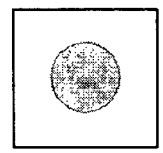
FIG. 9
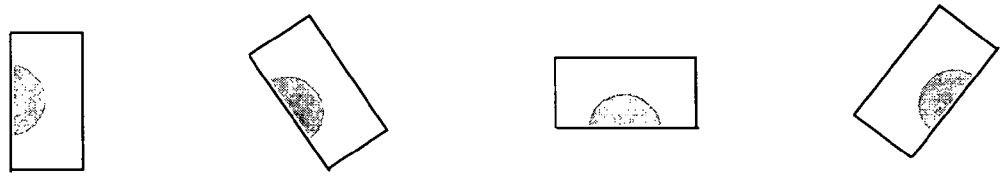
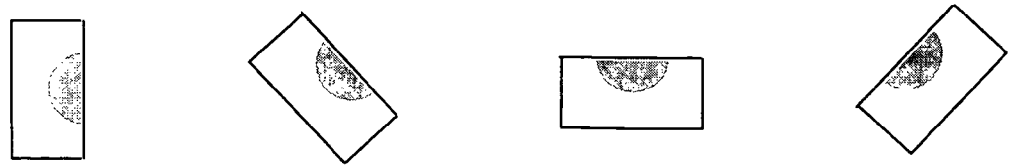
FIG. 10

| [IFN-γ] (IU/ml) | [IFN-γ] (pg/ml) | Response |
|---|---|---|
| 0.00 | 0 | 0.2 |
| 0.17 | 50 | 2.6 |
| 0.33 | 100 | 3.5 |
| 0.66 | 200 | 6.3 |
| 1.16 | 350 | 8.5 |
| 1.65 | 500 | 9.4 |
| 2.48 | 750 | 11.8 |
| 3.30 | 1000 | 18.3 |
| 4.95 | 1500 | 22.2 |
| 6.60 | 2000 | 36.8 |
| 8.25 | 2500 | 45.6 |
| 9.90 | 3000 | 60.4 |
| 11.55 | 3500 | 80.5 |
| 13.20 | 4000 | 95.6 |
| 16.50 | 5000 | 110.3 |
| 24.75 | 7500 | 131.7 |
| 33.00 | 10000 | 234.2 |
| 49.50 | 15000 | 254.0 |
| 99.00 | 30000 | 341.0 |
| 330.00 | 100000 | 419.7 |

FIG. 12

METHOD AND DEVICE FOR IMAGE-BASED BIOLOGICAL DATA QUANTIFICATION

CROSS-REFERENCE TO RELATED APPLICATION

This Patent Application claims the benefits of U.S. Provisional Patent Application Ser. No. 60/737,665, filed on Nov. 16, 2005 and entitled "Portable Biological Quantification Device," the entire content of which is hereby expressly incorporated by reference.

FIELD OF THE INVENTION

The present invention relates generally to a system and device for biological data quantification; and more particularly to a portable biological data quantification device.

BACKGROUND OF THE INVENTION

Many systems and devices have been developed for sensitive and quantitative detections for biological data applications. For example, a technology called Enzyme Linked Immunosorbent Assay (ELISA) is one of the more popular detection devices. ELISA applies a technique called a quantitative sandwich immunoassay. If a target such as IL-10 cytokine is present in a sample, it binds and becomes immobilized by an antibody pre-coated and "sandwiched" by biotin conjugate. To quantitatively determine the amount of IL-10 present in the sample, Avidin conjugated to Horseradish Peroxidase (HRP) is added to the detection microplate. The final combination of IL-10, biotin-conjugated antibody and enzyme-conjugated Avidin exhibits a change in color.

The color change is then measured spectrophotometrically as Optical Density (O.D.) at various wavelengths such as 450 nm, 492 nm or 620 nm. The concentration of IL-10 in the sample is then determined by the standard corresponding curve between the measured O.D. and the real concentration.

However this detection device has several disadvantages. For example, ELISA can only detect one target in each assay. Moreover, the detection time could be from 8 hours to over 20 hours. Additionally, the dimensions of width, length and height of the spectrum based reader device are normally around 10, 10 and 5 inches.

Another multi-target, sandwich type lateral flow assay has been developed based on Nano-Intelligent Detection System (NIDS). This multiplexed test format allows rapid detection of multi targets in few minutes. FIGS. 1A and 1B respectively illustrate top view and a side view of a lateral flow-based immunoassay ticket configuration. An adsorbent pad a receives a sample target and a conjugate release pad b includes a conjugate comprising of gold and antibody embedded therein. The sample passes through the conjugate release pad b and flows on a membrane c by a capillary flow. A zone d contains capture antibody (testing line), where antibody-antigen-antibody-gold complex (sandwich) is formed. A zone e containing control antibody where a control line is formed through direct antibody against another antispecies antibody. A receiving pad f receives liquid from the membrane c.

FIG. 2 is an illustration of positive and negative immunoassay tickets. The assay includes four components: a capture antibody, an antigen, a detector antibody for binding the target, and a labeled reporter molecule of interest which binds to the detector antibody. The sample liquid is added into one or more sample well(S). The control points or lines determine if the ticket itself is a functional ticket. In other words, if the control lines/points do not appear, the ticket is a bad ticket, regardless of the sample. For negative sample results, only control points or lines appear in the control zone c. For positive sample results, in addition to the control points or lines, there are target points or lines appearing in the target zone/area (T). The ticket window area in FIG. 2 is the inner rectangle that includes the control zone/area and the target zone/area.

The reporter can be an enzyme, a fluorophore, a colored particle, a dyed particle, a particle containing a dye, a stained particle, a radioactive label, quantum dots, nanocrystals, up-converting phosphorescent particles, metal sols, fluorophore or dye containing polymer or latex beads that are detectable visually and/or with mechanical assistance and the like.

Such an assay often requires three separate experimental steps. The first step involves immobilization of the capture antibody and reversibly binding the detector antibody on a solid surface, followed by a subsequent addition of an antigen solution to form an antibody-antigen complex. The last step is to add a reporter group comprising a labeled detector molecule or structure to generate a capture antibody-antigen-detector antibody reporter complex.

Therefore, there is a need to an efficient and accurate image-based biological data quantification device and apparatus.

SUMMARY OF THE INVENTION

In one embodiment, the present invention is a device and method for determining a concentration of a biological target. The device and method include capturing an image of a ticket including the biological target; extracting a region of interest from the captured image; detecting a target from the extracted region of interest; computing intensity of the target in the region of interest; and determining the concentration of the biological target according to the computed intensity.

In one embodiment, the present invention is a device for determining a concentration of a biological target. The device includes an optical module capturing an image of a ticket including the biological target; a sensor for converting the captured image to digital data; and a processor for processing the digital data. The processor includes an image calibration module for extracting a region of interest from the captured image, a target detection module for detecting a target from the extracted region of interest, and a target quantification module for computing intensity of the target in the region of interest and determining the concentration of the biological target according to the computed intensity.

BRIEF DESCRIPTION OF THE DRAWINGS

FIGS. 1A and 1B respectively illustrate top view and a side view of a lateral flow-based immunoassay ticket configuration;

FIG. 2 is an illustration of positive and negative immunoassay tickets, according to one embodiment of the present invention;

FIGS. 8A and 8B depict edge detecting masks for detecting a strong target contour, according to one embodiment of the invention;

FIG. 9 depicts a diagram of local area and inner area for medium target detection, according to one embodiment of the present invention;

FIG. 10 shows eight diagrams of partial local area and inner area of an assay according to one embodiment of the present invention;

FIG. 12 shows a corresponding data table for the sample curve of FIG. 11.

DETAIL DESCRIPTION

In one embodiment, the present invention is a handheld device as a quantification reader for biological and biochemical detection applications. In this, a one-step assay, such as a lateral flow or capillary assay, the reporter is reversibly affixed to the solid surface in a region after where detector antibody contacts antigen and a region before where the immobilized capture antibody is located. As a result of this "sandwich" assay, the unknown antigen can be identified, as well as the quantity and concentration of the antigen, which can be quantified, for example, with an optical reader. If the antigen is not present in the sample solution, no "sandwich" complex will be formed, and thus no signal will be observed.

Figure 3:
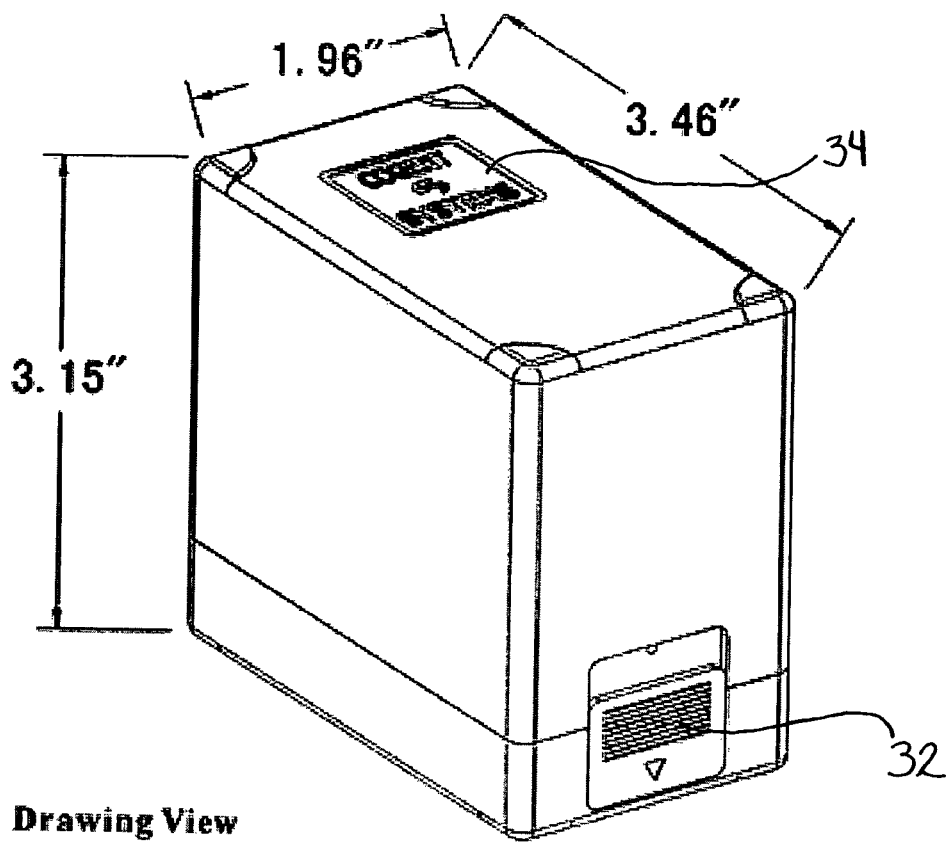
FIG. 3 shows an exemplary embodiment of a bio-reader and its exemplary dimensions, according to one embodiment of the present invention.

FIG. 3 shows an exemplary embodiment of a bio-reader and its exemplary dimensions. This small size platform allows detection, analysis and quantification of biological data in laboratories and in the field. An assay ticket including the target is inserted in area 32 and a number indicating the concentration of the target is displayed in a display panel 34.

In applications of drug discovery, medicine research and disease diagnostics, the detection targets include, but are not limited to, various cytokines such as Vascular Cell Adhesion Molecule-1 (VCAM-1), Interferon-γ (IFN-γ), Interleukin-6 (IL-6), and Interleukin-10 (IL-10) in human plasma, blood, urine and other body fluids. In applications of bio-defense, the detection targets include, but are not limited to, various biological agents such as vaccinia, ricin, botulinum toxin and anthrax spores in water.

Figure 4:
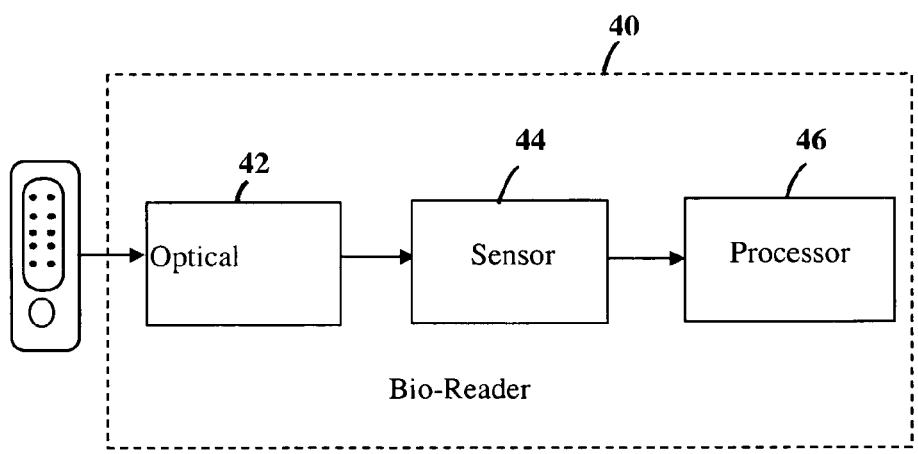
FIG. 4 depicts an exemplary hardware block diagram of a bio-reader, according to one embodiment of the present invention.

For the requirements of sensitive detection and precise quantification, an optical module is tailored to capture ticket images, analyze the assay results, and provide a measurement for the target concentration. Once a target is detected on the ticket window area, the inner area (of the target) is contrasted with the background area or local area for the intensity measurements. FIG. 4 depicts an exemplary hardware block diagram of a bio-reader 40. As shown, the bio-reader 40 includes three main parts: an optical module 42, a sensor 44, and a processor 46. The optical module 42 is capable of capturing clear and sharp images in the assay tickets. The sensor 44, for example, a CMOS sensor converts the captured image to digital data to be processed by the processor.

Figure 5:
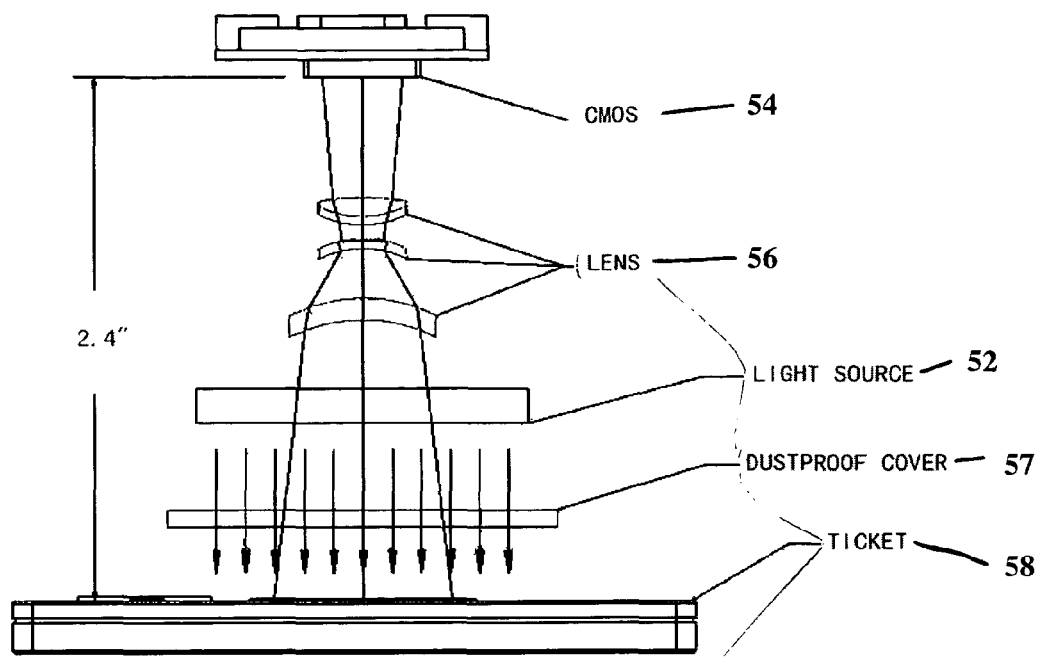
FIG. 5 shows an exemplary inner structure of the optical light path of a bio-reader, according to one embodiment of the present invention.

FIG. 5 shows an exemplary inner structure of the optical light path of a bio-reader. To capture clear and sharp images for the small targets in the assay tickets, a light source 52, for example, a ring-shape LED light source is applied to provide consistent lighting condition inside the bio-reader. A color light (for example, green) is used to obtain the best contrast images of the dyed assay targets.

In one embodiment, a CMOS sensor 54 converts the optical image of a ticket 58 to two-dimension digital data with low electric noise and high resolution requirements. A processor, controls the CMOS sensor to capture good quality images of the assay tickets and processes the images to obtain targets' concentrations.

In one embodiment, the processor includes a Dimensional Digital Signal Processor (D2SP), incorporates a two-dimensional image processing engine and supports memory bus interfaces with SDRAM, ROM, flash memory and SRAM devices. A 32-bit general purpose I/O port can be configured to a peripheral bus and an image data port to control digital image sensors.

Figure 6:
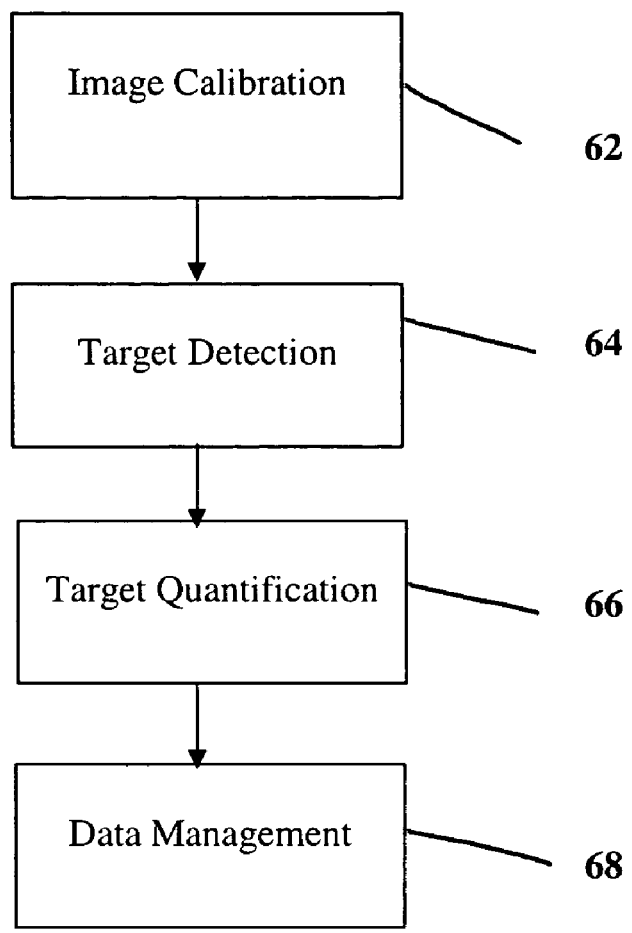
FIG. 6 illustrates an exemplary block diagram of software modules of an exemplary bio-reader, according to one embodiment of the invention.

FIG. 6 illustrates an exemplary block diagram of software modules of an exemplary bio-reader, according to one embodiment of the invention. As shown, the bio-reader software includes four main modules: an image calibration module 62, a target detection module 64, a target quantification module 66, and a data management module 68.

The image calibration module 62 extracts a Region of Interest (ROI) covering the target window area from the captured image. In one embodiment, the ROI is the entire ticket window area including a control zone and a target detection zone. Then, image calibration module 62 computes the brightness and contrast attributions of the captured image based on a control zone area of the ticket image. The control zone area includes control points or control lines, which are used to check the validity of the testing ticket, that is to indicate whether the ticket is a working (valid) ticket. In one embodiment, a set of standard tickets are used for quality control(QC). The image attributes of the QC tickets are set as pre-configured image attributes to check the validity of other testing tickets. In one embodiment, the image calibration module performs two types of operations for comparing the extracted and the pre-configured image attributes. The first operation adjusts the image to meet the required attributes. In one embodiment, a grayscale compensation for captured image is conducted based on the difference between the captured image and the pre-configured image attributes. If the first adjustment operation does not meet a given requirement, a second operation is performed to modify the sensor exposure parameters to re-capture the image. In one embodiment, default sensor exposure parameters include a Brightness value of 10, a Contrast value of 11 and an Exposure value of 165.

The target detection module 64 decides a positive (something is detected) or a negative (nothing is detected) result for the target tickets based on the analysis of the captured image. Based on the knowledge of geometrical pattern of the target tickets, the target detection module performs an image enhancement and pattern recognition process. The shape pattern of the target could be line, circle, rectangle or other geometrical shapes.

Figure 7A:
FIGS. 7A to 7C show images of three typical kinds of assays with strong, medium and weak concentrations, respectively.
Figure 7B:
Figure 7C:

FIGS. 7A to 7C show images of three typical kinds of assays with strong, medium and weak concentrations, respectively. For the targets with various concentrations from strong and weak, the image intensities vary in large range. Moreover, because the background area of the ticket image may have some streak noise due to the residual chemical materials, a multi-level detection device is developed for the targets with various intensity and shape features.

The first level of the detection device detects a target with strong concentration. As shown in FIG. 7A, the strong target has very sharp edges. Therefore, an edge detection and circular contour analysis device is applied to extract this kind of target. In one embodiment, the edge detecting masks shown in FIGS. 8A and 8B are applied to detect the strong target contour.

These masks respond maximally to edges running vertically and horizontally relative to the pixel grid, one mask for each of the two perpendicular orientations. The masks can be applied separately to the input image, to produce separate measurements of the gradient component in each orientation, Gx and Gy. These can then be combined together to find the absolute magnitude of the gradient at each point. The gradient magnitude is given by:

$$|G|=|Gx|+|Gy| \quad (1)$$

For the normal background of captured images, the gradient magnitude value is around zero. However for the contour area of the targets with strong concentration, magnitude values are more significant. In one embodiment, for targets with strong concentration, a threshold Th_E with a pre-determined value such as 20 is defined. If the magnitude value of an image pixel is larger than the threshold TH_E, this pixel is classified as a point of strong contour point. Otherwise, the pixel is classified as normal background point. If the classified points can generate a circle ring with specified radius, a strong target is detected with the circle's center point as the target's location.

The second level of the detection device detects a target with medium concentration, as shown in FIG. 7B. There is no sharp contour for this category. Based on a local grayscale distribution analysis, the target area with circular shape, instead of only strong contour, is separated from background. A local area around the target is selected. In one embodiment, the local area is a pre-determined area, for example, three times larger than a typical target area. For a local area with size N by N pixels, the minimal grayscale Min_Gray is found and then the average grayscale AVE_Gray is computed by averaging all of the pixel grayscale values of the local area. A threshold TH_C is computed by the mean value of the minimal grayscale and the average grayscale as follow:

$$TH\_C=(Min\_Gray+AVE\_Gray)/2 \quad (2)$$

FIG. 9 depicts a diagram of local area and inner area (of the target) for medium target detection, according to one embodiment of the present invention. The local area is divided to two areas an inner area and an outer area. In one embodiment, a pixel belongs to the inner area of the target, if its distance to the center of the local area is less than N/4. Otherwise, the pixel belongs to the outer area (background). An image point is classified as target point if the grayscale value is less than TH_C. Otherwise, the image point is classified as background point. If the total number of target points within the inner area is larger than N*N/8 and the total number of target points within the outer area is equal to zero, a medium target is detected with the local area's center point as the target's location.

The third level of the detection device detects a weak target. As shown in FIG. 7C, the weak target does not have full circular shape. In this case, the weak target is extracted based on partial circular shape features extracted from noisy background. FIG. 10 shows eight diagrams of partial local area and inner area. Similar device for medium target detection is applied on this partial circular shape analysis. Here, the local area of interest is half rectangle and inner area is half circular, compared with above-mentioned medium target detection device. As a result, all of the corresponding thresholds are half of the values used for the medium target detection.

Referring back to FIG. 6, when a positive target is detected, a target quantification module 66 computes the image density from the image data and determines the target's concentration by using pre-determined (for example, laboratory developed) data (for example, the curve shown in FIG. 11)) for specific targets. A local area with the located target position as the center is segmented to perform the image intensity computation (typically, the local area is three times larger than target area). In one embodiment, the target intensity value is computed based on the differences of image grayscale values between target area and the background area.

To avoid intervention of noise existing in both the target area and the background area, a point classification device is applied to extract both target and background points. An overall average grayscale value Ave_All is calculated at first in the entire local area. The Ave_All is computed by the following equation:

$$Ave\_All=\Sigma P(i,j)/Number\_All \quad (3)$$

Where, P(i,j) is the grayscale value of the point (i,j) in the local area, and Number_All is the total point (pixel) numbers within the local area. A target average grayscale Ave_Tar is then computed based on the image pixels for which grayscales are darker than the overall average grayscale. The Ave_Tar is computed by the following equation:

$$Ave\_Tar=\Sigma P\_Tar(i,j)/Number\_Tar, P\_Tar(i,j)<Ave\_All \quad (4)$$

Where, P_Tar(i,j) is the grayscale value of the target point, and Number_Tar is the total target point number. A background average grayscale Ave_Back is computed based on the image pixels which grayscales are brighter than the overall average grayscale. Ave_Back is given by the following:

$$Ave\_Back=\Sigma P\_Back(i,j)/Number\_Back, P\_Back(i,j)>Ave\_All \quad (5)$$

Where, P_Back(i,j) is the grayscale value of the background point, and the Number_Back is the total background point number. The local image intensity value is computed by:

$$Intensity\_Value=(Ave\_Tar-Ave\_Back)*(Ave\_Tar-Ave\_Back) \quad (6)$$

Figure 11:
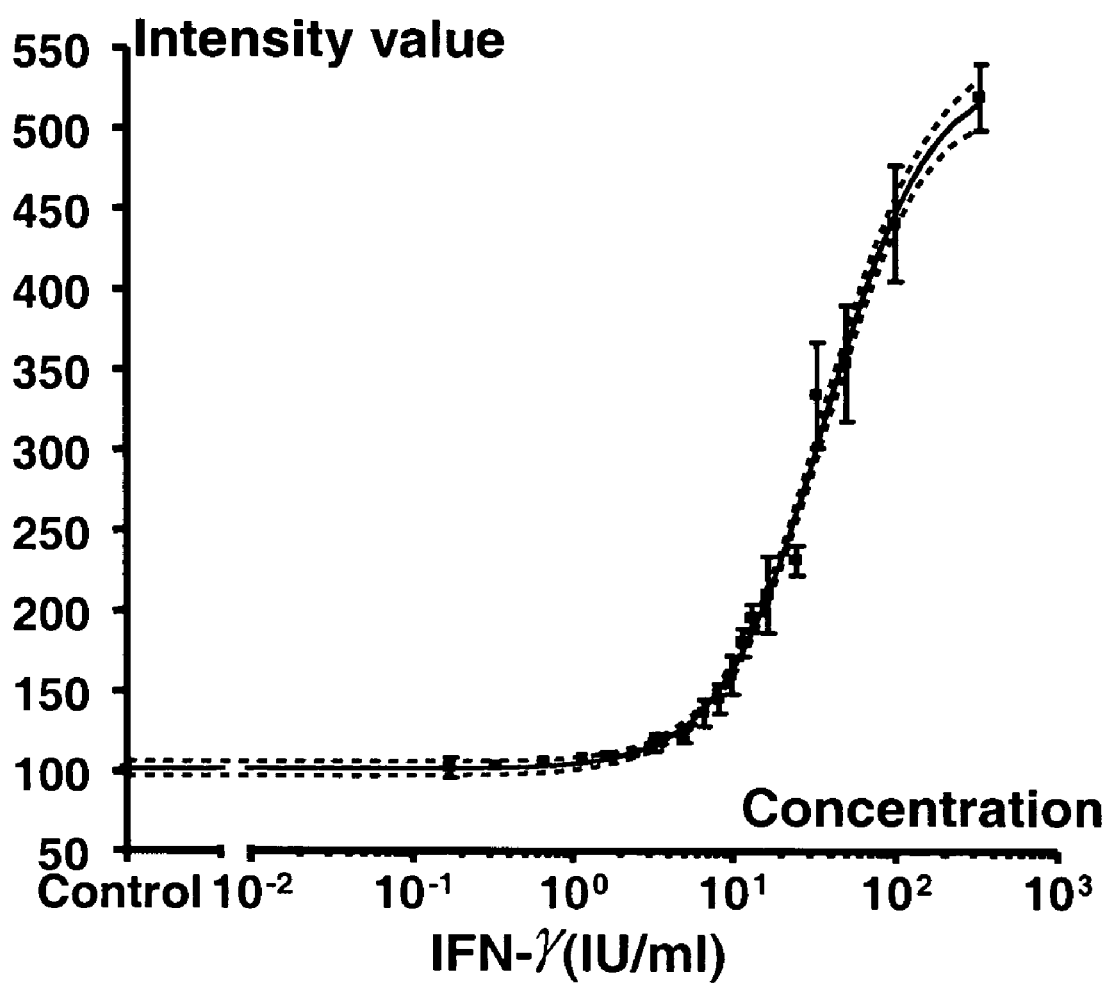
FIG. 11 shows a sample curve depicting a relationship between computed intensity value and real concentration of a target.

The target concentration is obtained from the computed image intensity value using a quantitative pre-determined corresponding curve or a lookup table, stored in a memory of the device or an external computer. FIGS. 11 and 12 show a sample curve and the corresponding data table to describe the relationship between image intensity value and target concentration for cykotines Interferon-γ (IFN-γ). The curve in FIG. 11 shows the corresponding relationship between the target concentration and the computed intensity (Intensity_Value). The table in FIG. 12 shows some samples. For example, if the computed Intensity_Value is 11.8, then the real target concentration is 750 in unit pg/ml and 2.48 in unit IU/ml. The unit IU/ml is defined as Infectious Unit per milliliter, and unit pg is defined as pico gram per milliliter.

Referring back to FIG. 6, a data management module 68 saves the captured image intensity and the computed target concentrations. For various applications, the data can be uploaded to computers, other handheld devices and the like for further data analysis.

In one embodiment, the bio-reader and the NIDS technology are utilized to monitor a human immune response by producing an assay capable of detecting Vascular Cell Adhesion Molecule-1 (VCAM-1), Interferon-γ (IFN-γ), Interleukin-6 (IL-6), and Interleukin-10 (IL-10) in human plasma samples. These four proteins are chosen for the initial multiplexed assay as they are frequently used to examine human immune response to vaccination and viral infection as well as to monitor the immune response to diseases or other stresses.

Using the developed 4-plexed assays, an external calibration curve is generated over clinically relevant levels for each cytokine spiked in human plasma. Quantitative results are presented showing high degree of precision and a low incidence of variation.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope of the invention as defined by the appended claims.

What is claimed is:

1. A method for determining a concentration of a biological target, the method comprising:
    capturing an image of a ticket including the biological target;
    extracting a region of interest from the captured image;
    detecting a target from the extracted region of interest comprising a multi-level target detection based on a concentration of the target, the multi-level target detection including:
        detecting a target with a high concentration by applying an edge detection and circular contour analysis to extract the target with a high concentration;
        detecting a target with a medium concentration by analyzing a local grayscale distribution to separate a target area with circular shape background; and
        detecting a target with a low concentration by extracting partial circular shape features from the background;
    electronically computing intensity of the target in the region of interest; and
    determining the concentration of the biological target according to the computed intensity.

2. The method of claim 1, wherein electronically computing intensity comprises electronically computing the intensity of the target in the region of interest according to image grayscale differences of image grayscale values between the target and a background area.

3. The method of claim 2, wherein electronically computing intensity comprises:
    computing an average grayscale value for the target area and the background area;
    computing an average grayscale value for the target area;
    computing an average grayscale value for the background area; and
    electronically computing the target intensity responsive to the average grayscale for the target area and the average grayscale for the background area.

4. The method of claim 1, wherein determining the concentration comprises selecting pre-determined data related to intensity and concentration of the target, and electronically determining the concentration of the target according to the pre-determined data.

5. The method of claim 4, wherein the pre-determined data is a look-up table stored in a memory.

6. The method of claim 1, wherein detecting a target comprises:
    electronically computing a gradient magnitude value for each pixel in the region of interest;
    comparing the computed gradient magnitude value to a pre-determined threshold value; and
    classifying a pixel as being within the region of interest, if the computed gradient magnitude value of the pixel is larger than the pre-determined threshold value.

7. The method of claim 1, further comprising displaying the concentration of the biological target on a display.

8. A portable device for determining a concentration of a biological target comprising:
    an optical module for capturing an image of a ticket including the biological target;
    a sensor for converting the captured image to digital data; and
    a processor for processing the digital data, the processor comprising:
        an image calibration module for checking the ticket validity from the captured image,
        a target detection module for detecting a target from the extracted region of interest using a multi-level target detection based on a concentration of the target, wherein the target detection module is configured for:
            detecting a target with a high concentration by applying an edge detection and circular contour analysis to extract the target with a high concentration;
            detecting a target with a medium concentration by analyzing a local grayscale distribution to separate a target area with circular shape background; and
            detecting a target with a low concentration by extracting partial circular shape features from the background, and
        a target quantification module for computing intensity of the target in the region of interest and determining the concentration of the biological target according to the computed intensity.

9. The device of claim 8, wherein the target quantification module computes the intensity of the target in the region of interest according to image grayscale differences of image grayscale values between the target and a background area.

10. The device of claim 9, wherein the target quantification module computes an average grayscale value for the target area and the background area, computes an average grayscale value for the target area, computes an average grayscale value for the background area, and computes the target intensity responsive to the average grayscale for the target area and the average grayscale for the background area.

11. The device of claim 8, wherein the target quantification module selects pre-determined data related to intensity and concentration of the target and determines the concentration of the target according to the pre-determined data.

12. The device of claim 11, wherein the pre-determined data is a look-up table stored in a memory.

13. The device of claim 8, wherein the target detection module computes a gradient magnitude value for each pixel in the region of interest, compares the computed gradient magnitude value to a pre-determined threshold value, and classifies a pixel as being within the region of interest, if the computed gradient magnitude value of the pixel is larger than the pre-determined threshold value.

14. The device of claim 1, further comprising a display panel for displaying the concentration of the biological target.

15. A device for determining a concentration of a biological target comprising:
    means for capturing an image of a ticket including the biological target;
    means for extracting a region of interest from the captured image;

means for detecting a target from the extracted region of interest comprising a multi-level target detection based on a concentration of the target, the multi-level target detection including:
    means for detecting a target with a high concentration by applying an edge detection and circular contour analysis to extract the target with a high concentration
    means for detecting a target with a medium concentration by analyzing a local grayscale distribution to separate a target area with circular shape background; and
    means for detecting a target with a low concentration by extracting partial circular shape features from the background;
means for computing intensity of the target in the region of interest; and
means for determining the concentration of the biological target according to the computed intensity.

16. The device of claim 15, wherein means for computing intensity of the target comprises means for computing the intensity of the target according to image grayscale differences of image grayscale values between the target and a background area.

17. The device of claim 16, wherein means for computing intensity comprises:
    means for computing an average grayscale value for the target area and the background area;
    means for computing an average grayscale value for the target area;
    means for computing an average grayscale value for the background area; and
    means for computing the target intensity responsive to the average grayscale for the target area and the average grayscale for the background area.

18. The device of claim 15, wherein means for determining the concentration comprises means for selecting pre-determined data related to intensity and concentration of the target, and means for determining the concentration of the target according to the pre-determined data.

19. The device of claim 18, wherein the pre-determined data is a look-up table stored in a memory.

20. The device of claim 15, wherein means for detecting a target comprises:
    means for computing a gradient magnitude value for each pixel in the region of interest;
    means for comparing the computed gradient magnitude value to a pre-determined threshold value; and
    means for classifying a pixel as being within the region of interest, if the computed gradient magnitude value of the pixel is larger than the pre-determined threshold value.

* * * * *

UNITED STATES PATENT AND TRADEMARK OFFICE
CERTIFICATE OF CORRECTION

Page 1 of 1

PATENT NO. : 8,131,477 B2
APPLICATION NO. : 11/501377
DATED : March 6, 2012
INVENTOR(S) : Songtao Li It is certified that error appears in the above-identified patent and that said Letters Patent is hereby corrected as shown below:

In the Specification

Column 5

Line 19 (Approx), delete "Th_E" and insert -- TH_E --, therefor.

Column 6

Line 49, delete "cykotines" and insert -- cytokines --, therefor.

In the Claims

Column 8

Line 60, in Claim 14, delete "1" and insert -- 8 --, therefor.

Column 9

Line 7, in Claim 15, after "concentration" insert -- ; --.

Signed and Sealed this
Twenty-fourth Day of September, 2013

Teresa Stanek Rea
*Deputy Director of the United States Patent and Trademark Office*